Jan 6, 1931. V. G. HONSTAIN 1,787,526
PROCESS OF MAKING PULVERIZING DEVICES
Filed Nov. 15, 1928 2 Sheets-Sheet 1
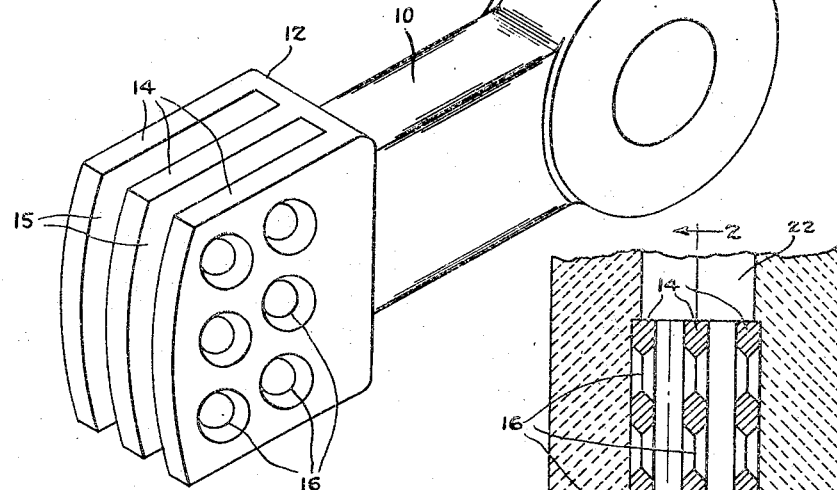
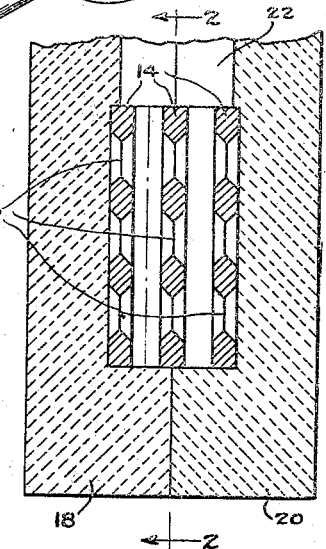
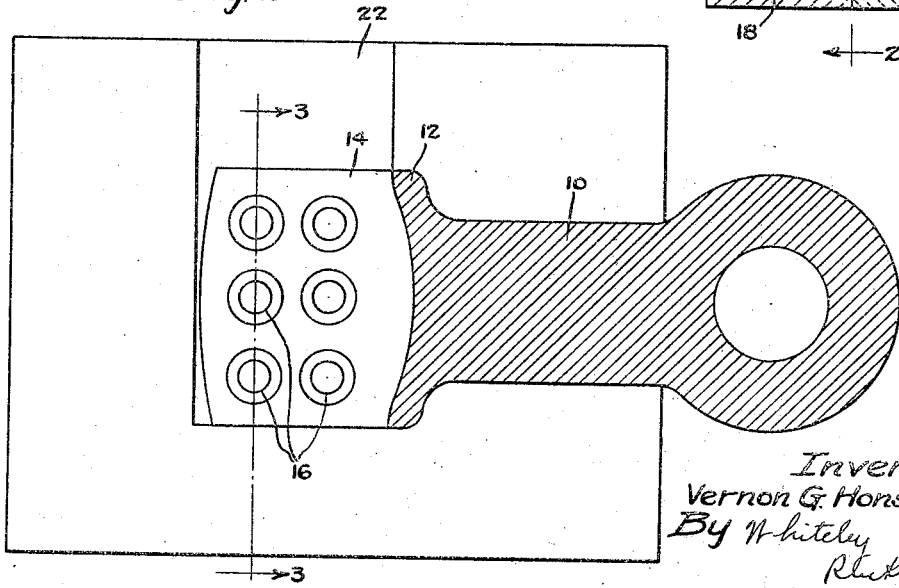
Inventor:
Vernon G. Honstain.
By Whiteley and Rickman
Attorneys.

Jan 6, 1931. V. G. HONSTAIN 1,787,526
PROCESS OF MAKING PULVERIZING DEVICES
Filed Nov. 15, 1928 2 Sheets-Sheet 2

Inventor:
Vernon G. Honstain
By Whiteley and Ruckman
Attorneys

Patented Jan. 6, 1931

1,787,526

UNITED STATES PATENT OFFICE

VERNON G. HONSTAIN, OF MINNEAPOLIS, MINNESOTA

PROCESS OF MAKING PULVERIZING DEVICES

Application filed November 15, 1928. Serial No. 319,564.

My invention relates to pulverizing devices and processes of making the same. An object of the invention is to provide a device of this character which is composed of juxtaposed layers of comparatively soft metal having high ductility and of comparatively hard metal having great wear resistance. I have found that a much better article to be used for crushing and pulverizing hard material such as rock is produced by combining these two metals than is produced by either one alone. The soft metal alone while not readily cracked or broken wears away too quickly and the hard metal alone while not readily worn away is apt to crack or break. By employing juxtaposed layers of the two metals, the advantages of both for my purpose are obtained and the defect of each one is largely neutralized by the presence of the other.

The full objects and advantages of my invention will appear in connection with the detailed description thereof, and the novel features of my inventive idea will be particularly pointed out in the claims.

Figure 4:
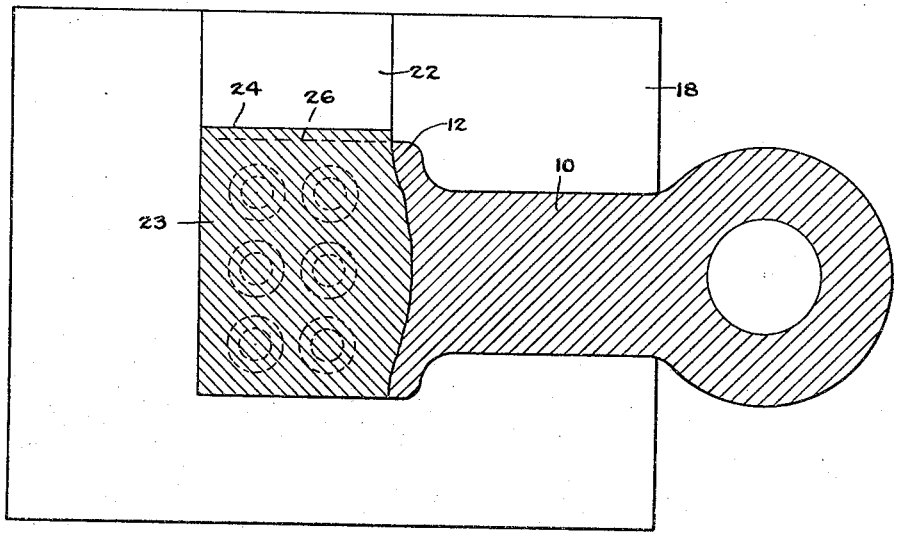
Figure 5:
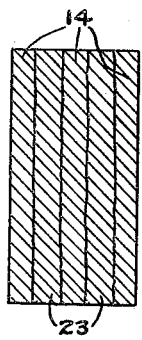
Figure 6:
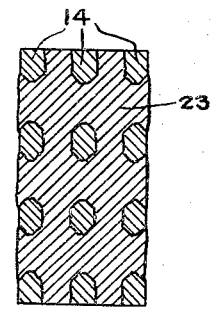
Figure 7:
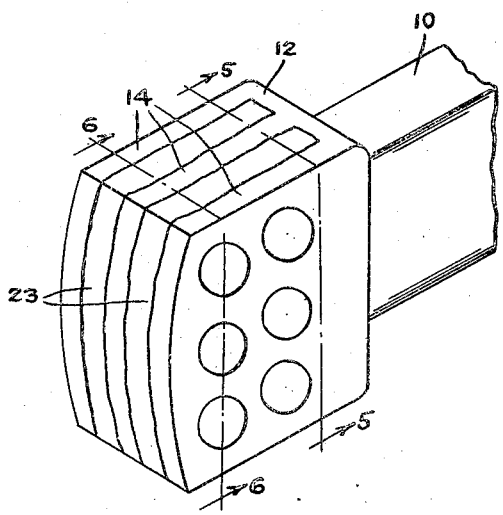

In the accompanying drawings which illustrate the application of my invention, Fig. 1 is a perspective view of the main portion of the device. Fig. 2 is a view in section on the line 2—2 of Fig. 3 showing the head of the main portion placed in a mold. Fig. 3 is a view in section on the line 3—3 of Fig. 2. Fig. 4 is a view similar to Fig. 2 showing metal poured into the mold. Fig. 5 is a view in section on the line 5—5 of Fig. 7. Fig. 6 is a view in section on the line 6—6 of Fig. 7. Fig. 7 is a perspective view of the finished head of the device.

Referring to the drawings, Fig. 1 shows the main portion of the device which, for example, may be a device used in hammer mills for pulverizing and crushing. As shown, this device has a shank 10 which carries a head 12 made up of a number of wings 14 separated from each other by spaces 15, there being three of these wings in the form shown. Each of the wings is provided with a number of openings 16 which are beveled outwardly toward the two sides of the wing in which they are formed. This portion of the device is formed of comparatively soft metal such as steel having high ductility and not readily cracked or broken and preferably formed by casting. To complete the device, the head thereof is placed in a mold consisting of the two complementary members 18 and 20 which are so shaped interiorly as to snugly receive the head and with a pouring opening 22 formed at the top. The members 18 and 20 are preferably formed of core sand baked in the usual manner so as to be self-sustaining and therefore not requiring an outside flask for supporting the sand. In order to form the supplementary portion of the device indicated by the numeral 23, comparatively hard metal in a moulten condition such as steel having great wear resistance is then poured into the mold so as to fill the spaces 15 and the openings 16. In Fig. 1, the top line of the moulten metal is indicated at 24 while the dotted line 26 indicates the extent to which the metal is ground away when the device is removed from the mold so that a smooth surface is produced for the portion last poured. From Fig. 5, is will be understood that the moulten hard metal fuses with the soft metal constituting the wings. From Fig. 6, it will be understood that the molten metal flows into the beveled openings 16 and becomes anchored therein and also fuses with the material surrounding the openings particularly the sharp edges thereof so that the layers are firmly secured together.

I claim:

1. The process of making pulverizing devices which consists in providing a main portion of comparatively soft metal having wings spaced from each other and positioned at one end of the main portion, placing said wings only in a mold, and casting a supplementary portion of comparatively hard metal in the space between said wings.

2. The process of making pulverizing devices which consists in providing a main portion of comparatively soft metal having wings spaced from each other and positioned at one end of the main portion, providing said wings with openings, placing said wings only in a mold, and casting a supplementary portion of comparatively hard metal in the space between said wings and in said openings whereby the two portions are firmly secured together.

In testimony whereof I hereunto affix my signature.

VERNON G. HONSTAIN.